UNITED STATES PATENT OFFICE.

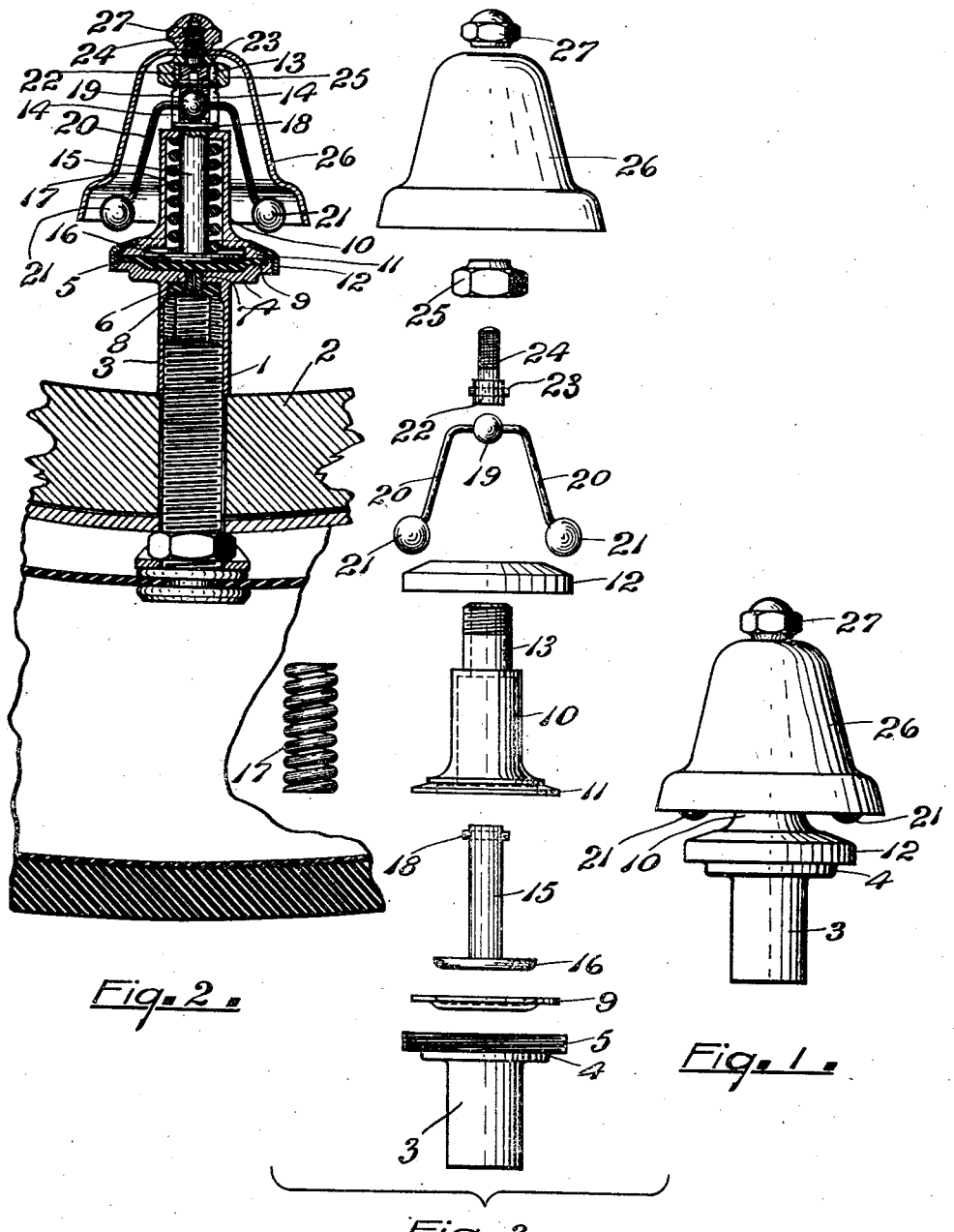

CHARLES E. JOHNSON, OF HIGHLAND PARK, MICHIGAN.

TIRE-ALARM.

1,332,729.     Specification of Letters Patent.     Patented Mar. 2, 1920.

Application filed November 14, 1916. Serial No. 131,192.

*To all whom it may concern:*

Be it known that I, CHARLES E. JOHNSON, a citizen of the United States of America, residing at Highland Park, in the county of Wayne and State of Michigan, have invented certain new and useful Improvements in Tire-Alarms; and I do hereby declare the following to be a full, clear, and exact description of the invention, such as will enable others skilled in the art to which it appertains to make and use the same.

This invention relates to an alarm especially adapted for use with pneumatic tires, it being the primary object and purpose of the invention to produce an alarm which is inoperative and does not sound while the pressure in the tire is at or above a certain amount but which when the pressure is reduced below that amount sounds while the wheel on which the tire is placed is moving. Another object of the invention consists in the provision of an alarm of this character which may be made from very simple and easily manufactured parts so that the cost of production is comparatively small. Many other objects and purposes together with novel constructions and arrangement of parts for the attainment of these and other ends not specifically enumerated will be apparent as understanding of the construction is had, referring to the accompanying drawing, in which:

Figure 1 is a side elevation of the alarm.

Fig. 2 is a vertical section taken therethrough showing the same attached to a valve stem such as is commonly used with pneumatic tires, and Fig. 3 shows in side elevation all of the parts from which my alarm is made.

Like reference characters refer to like parts throughout the several views of the drawings.

The alarm in use is secured to the valve stem 1 of a pneumatic tire the same passing through the felly 2 of a wheel on which the tire is used. A member including an interiorly threaded sleeve 3 is provided which at its upper end is formed with a shallow disk 4, with edges threaded as indicated at 5. The upper end of the sleeve is closed in any suitable manner by a partition 6 in the center of which a short plug 7 is located being secured therein in any suitable manner and having a passage through it. This plug, when the sleeve 3 is secured on to the valve stem 1, strikes against the valve pin within the stem depressing the same to permit the escape of air which passes through the passage in the plug 7 and, if desired, any suitable rubber gasket as 8 may be interposed between the part 6 and the upper end of the valve stem to insure against leakage of air between sleeve 3 and the stem.

The disk 4 contains a rubber washer or diaphragm 9. Directly above said disk a housing member 10 is located at its lower end flared outwardly to provide a bearing member 11 which engages against the outer portions of the diaphragm. The housing 10 and the disk 4 are connected together by means of an interiorly threaded member 12 which screws on to the threaded portion 5 of the disk thereby binding the disk, diaphragm and part 11 of the housing together and making an air tight connection between them. The upper portion of the housing 10 is extended in the form of a sleeve 13 threaded at its upper end and formed with oppositely located slots 14 in its sides.

The housing 10 receives a plunger 15 at its lower end formed with a head 16 between which and the upper end of the housing a strong spring coil 17 is placed, the tendency of the spring being to force the housing 16 against the diaphragm 9. A pin 18 is passed through the upper end of the plunger 15 its ends seating in slot 14 heretofore described so as to prevent crushing or injury of the diaphragm 9, said pin 18 stopping the downward movement of the plunger at a certain point. Upon the upper end of the plunger and in the sleeve 13 a ball 19 is located from which, on opposite sides, extend arms 20 through the slots 14 said arms being bent in a downward direction and terminating in clappers 21. Above the ball 19 and also within the upper part of sleeve 13 a member 22 is located, it having a pin 23 passing therethrough which also at its ends is located in the slots 14. A reduced threaded extension 24 formed integral with member 22 extends upwardly beyond the upper end of sleeve 13. A nut 25 is threaded onto the upper end of sleeve 13 and is formed with a central passage for the extension 24. A bell 26 is located above and upon nut 25 the extension 24 passing therethrough so as to receive a lock-nut 27 which holds the bell securely in place.

In operation the alarm having been attached to the valve stem of the air tube of a pneumatic tire the pressure of the air in the tire is transmitted to the diaphragm 9, the tendency thereof being to elevate plunger 15 against the force of spring 17. If the pressure is sufficient to overcome the spring the plunger is elevated so as to bring ball 19 tight against the lower part of the member 22 it being apparent that under this condition the ball is held against movement and the arms 20 and clappers 21 attached thereto are correspondingly immovable with respect to the rest of the mechanism. When the pressure in the tube reduces below the point where it can overcome spring 17, said spring depresses the plunger thereby freeing ball 19 and arms 20 and clappers 21 attached thereto so that under the movement of a wheel on which the tire is placed, the clappers strike against the bell continuously, giving notice that the pressure in the tire is below what it should be. The spring 17 may be of any proper or desired strength so as to cause the alarm to become operative when the pressure diminishes below a certain predetermined and desired amount.

I claim:—

1. In combination, a support having its lower portion interiorly threaded for detachable attachment to the valve stem on a pneumatic tire, said support having a flexible diaphragm therein between its ends, means adapted to act on the valve of a valve stem as the support is threaded thereon to release the air pressure of the tube against said diaphragm, a plunger located above the diaphragm, spring means tending to force the plunger against the diaphragm, a clapper device having a part positioned above the plunger, means above said part against which it is forced on admission of pressure against the plunger greater than the strength of the spring, and a bell carried by the support adjacent the clapper device.

2. In combination, an interiorly threaded sleeve, a disk at the upper end of the sleeve, a partition closing the upper end of the sleeve, a plug depending from the partition, there being a passage permitting the passage of air from the sleeve through the partition, a flexible diaphragm above the disk, a housing having its lower end seated against the outer portions of the diaphragm, means to connect said disk and housing, a plunger in the housing having an enlarged head seated against the diaphragm, a spring in the housing acting on the plunger to force it against said diaphragm, a sleeve extending from the housing into which an end of the plunger extends, a ball in the sleeve, a clapper attached to the ball, a member in the sleeve above the ball, a nut threaded onto the end of the sleeve and engaging against said member to hold it from outward movement, and a bell supported adjacent said clapper.

In testimony whereof I affix my signature.

CHARLES E. JOHNSON.